(12) United States Patent
Gregory et al.

(10) Patent No.: US 10,871,017 B2
(45) Date of Patent: Dec. 22, 2020

(54) MOTOR VEHICLE HAVING A MANUAL REAR CLOSURE MEMBER

(71) Applicant: Ford Global Technologies, LLC, Dearborn, MI (US)

(72) Inventors: Jonathan Gregory, Colchester (GB); Sam Penzato, Bath (GB); William Gerald Barr, Chelmsford (GB); Matthew David Bunn, Maldon (GB)

(73) Assignee: Ford Global Technologies, LLC, Dearborn, MI (US)

( * ) Notice: Subject to any disclaimer, the term of this patent is extended or adjusted under 35 U.S.C. 154(b) by 258 days.

(21) Appl. No.: 15/958,353

(22) Filed: Apr. 20, 2018

(65) Prior Publication Data

US 2018/0371812 A1 Dec. 27, 2018

(30) Foreign Application Priority Data

Jun. 23, 2017 (GB) .................................. 1710037.1

(51) Int. Cl.
*E05D 11/10* (2006.01)
*E05F 5/00* (2017.01)
(Continued)

(52) U.S. Cl.
CPC ........... *E05D 11/1007* (2013.01); *B60J 5/101* (2013.01); *E05F 5/00* (2013.01); *E05F 15/40* (2015.01); *E05F 15/43* (2015.01); *E05D 3/02* (2013.01); *E05F 2015/432* (2015.01); *E05Y 2201/21* (2013.01); *E05Y 2201/218* (2013.01); *E05Y 2201/22* (2013.01); *E05Y 2201/232* (2013.01); *E05Y 2201/408* (2013.01); *E05Y 2201/448* (2013.01); *E05Y 2201/458* (2013.01); *E05Y 2201/71* (2013.01); *E05Y 2201/712* (2013.01); *E05Y 2400/20* (2013.01); *E05Y 2400/44* (2013.01); *E05Y 2400/53* (2013.01); *E05Y 2900/532* (2013.01); *E05Y 2900/546* (2013.01); *E05Y 2900/548* (2013.01)

(58) Field of Classification Search
CPC .. E05D 11/1007; E05D 11/1085; B60J 5/101; E05F 15/43
See application file for complete search history.

(56) References Cited

U.S. PATENT DOCUMENTS 5,408,726 A * 4/1995 Kent .................... E05D 11/1007
16/320
5,774,938 A * 7/1998 Kent .................... E05D 11/1007
16/330

(Continued)

FOREIGN PATENT DOCUMENTS

| DE | 10132886 A1 | 1/2003 |
|---|---|---|
| DE | 102005033098 A1 | 1/2007 |
| GB | 2340178 A | 2/2000 |

*Primary Examiner* — Catherine A Kelly
(74) *Attorney, Agent, or Firm* — David Coppiellie; Price Heneveld LLP

(57) ABSTRACT

A motor vehicle is disclosed having a safety system that includes an electronic controller controlling an electronically controlled mechanism in response to inputs from a number of rear parking sensors to prevent movement of a rear closure of the motor vehicle in a closing direction when more than one object is sensed to be within a rear protection zone and the rear closure member is in a fully open position.

20 Claims, 6 Drawing Sheets

(51) Int. Cl.
 *E05F 15/40* (2015.01)
 *E05F 15/43* (2015.01)
 *B60J 5/10* (2006.01)
 *E05D 3/02* (2006.01)

(56) References Cited

U.S. PATENT DOCUMENTS

| | | | | |
|---|---|---|---|---|
| 6,084,367 | A * | 7/2000 | Landert | E05F 15/70 |
| | | | | 318/466 |
| 6,205,710 | B1 * | 3/2001 | Busse | G01S 13/48 |
| | | | | 49/27 |
| 6,321,488 | B1 * | 11/2001 | Bigoszewski | E05F 15/638 |
| | | | | 49/139 |
| 6,676,186 | B2 * | 1/2004 | Greif | B60J 5/101 |
| | | | | 296/106 |
| 7,221,118 | B2 * | 5/2007 | Sasaki | E05F 15/43 |
| | | | | 318/282 |
| 7,984,590 | B2 * | 7/2011 | Hoshide | E05F 15/73 |
| | | | | 49/31 |
| 8,868,299 | B2 * | 10/2014 | Kroemke | B60R 25/246 |
| | | | | 701/49 |
| 9,097,048 | B2 * | 8/2015 | McCullough | A47B 3/08 |
| 9,151,692 | B2 * | 10/2015 | Breed | B60R 21/01516 |
| 9,834,175 | B2 * | 12/2017 | Tokudome | B60R 25/2036 |
| 10,443,290 | B2 * | 10/2019 | Tokudome | B60R 25/2054 |
| 2002/0189168 | A1 * | 12/2002 | Sicuranza | E05C 17/00 |
| | | | | 49/26 |
| 2004/0040771 | A1 * | 3/2004 | Ploucha | E05F 15/43 |
| | | | | 180/271 |
| 2008/0309120 | A1 * | 12/2008 | Kohlstrand | E05C 17/003 |
| | | | | 296/146.11 |
| 2014/0207344 | A1 | 7/2014 | Ihlenburg et al. | |
| 2016/0208537 | A1 * | 7/2016 | Senguttuvan | E05F 15/73 |
| 2016/0314362 | A1 | 10/2016 | Elie et al. | |
| 2017/0009509 | A1 * | 1/2017 | Ryu | B60R 25/2054 |
| 2018/0003808 | A1 * | 1/2018 | Niwa | G01S 15/88 |
| 2018/0297519 | A1 * | 10/2018 | Singh | B60J 5/101 |
| 2019/0024435 | A1 * | 1/2019 | Partsch | E05F 15/611 |

* cited by examiner

MOTOR VEHICLE HAVING A MANUAL REAR CLOSURE MEMBER

FIELD OF THE INVENTION

This invention generally relates to motor vehicles, and more particularly relates to a motor vehicle having a manually operable rear closure member.

BACKGROUND OF THE INVENTION

It is generally known to provide a motor vehicle such as a hatchback motor vehicle, a multipurpose vehicle (MPV), a sports utility vehicle (SUV) or a van with a manually moveable rear closure member hingedly connected to the motor vehicle near an upper end to provide access to a rear compartment of the motor vehicle such as a trunk, boot, cargo area or luggage space. Such rear closure members are sometimes referred to as "tailgates," "trunk lids," "rear hatches," or "rear doors."

After retrieving items from the rear compartment of a vehicle, the final act typically is to close the rear closure member, which usually involves a user reaching up and pulling the rear closure member downwards. A typical rear closure member is heavy and requires considerable effort to close it in order to overcome pressure within gas struts normally used to hold the rear closure member in an open position. Once the closing process starts considerable momentum is generated and the process will normally not stop until the closure member reaches a closed position where it latches to part of a body structure of the motor vehicle.

Another person, in particular, a child, may not notice that the rear closure member is about to be closed and may reach into the rear compartment to retrieve an item. If the person closing the rear closure member does not notice the other person (child) attempting to retrieve an item they likely will not stop the closing process. This may have the undesirable consequence that the rear closure member may impact against the item or the person attempting to retrieve the item from the rear compartment.

It would be desirable to provide a motor vehicle having a safety system to reduce the risk of impact from occurring when a rear closure member is to be closed.

SUMMARY OF THE INVENTION

According to a first aspect of the invention, there is provided a motor vehicle having a top hinged rear closure member manually moveable between open and closed positions, an electronically controlled mechanism to prevent, at least when the rear closure member is in a fully open position, movement of the rear closure member in a closing direction, a number of rear parking sensors to provide an indication of whether one or more objects lies within a rear protection zone, and an electronic controller arranged to operate the electronically controlled mechanism to prevent movement of the rear closure member in a closing direction when the parking sensors indicate that more than one object is located within the rear protection zone. This has the advantage that the risk of impact during closing of the rear closure member is reduced.

The electronic controller may be arranged to operate the electronically controlled mechanism to prevent movement of the rear closure member in a closing direction only if the rear closure member is in a fully open position. The electronic controller may be arranged to operate the electronically controlled mechanism to prevent movement of the rear closure member in a closing direction when the rear closure member is in a partially closed position.

The electronically controlled mechanism may be an electronically controlled latching mechanism comprising a solenoid actuator having a latching pin moveable into engagement with a hinge member forming one half of a hinge mechanism used to hingedly connect the rear closure member to a structural part of the motor vehicle so as to prevent movement of the hinge member. The solenoid actuator may be operable to move the latching pin into engagement with the hinge member when it is required to prevent movement of the rear closure member in a closing direction. The latching pin may be moved into engagement with an abutment surface on the hinge member when it is required to prevent movement of the rear closure member in a closing direction.

The hinge member may be a first hinge member fastened to the rear closure member and the hinge mechanism may include a second hinge member pivotally connected to the first hinge member and fastened to part of a body structure of the motor vehicle and the solenoid actuator may be fastened to the second hinge member.

Alternatively, the electronically controlled mechanism may comprise a pump drivingly connected between first and second hinge members forming a hinge mechanism used to hingedly connect the rear closure member to a body structure of the motor vehicle and an electronically controlled valve to prevent the flow of liquid from an outlet of the pump to an inlet of the pump through a recirculation circuit when it is required to prevent movement of the rear closure member in a closing direction. In which case, the first hinge member may be a hinge member fastened to the rear closure member and the second hinge member may be a hinge member pivotally connected to the first hinge member and fastened to the body structure of the motor vehicle. The pump may be fastened to the second hinge member and may have a drive shaft drivingly connected by a gear wheel to a quadrant gear fastened to the first hinge member.

According to a second aspect of the present invention, there is provided a vehicle having rear closure member manually moveable between open and closed positions, a controlled mechanism to prevent movement of the rear closure member in a closing direction, sensors sensing objects located within a rear protection zone, and a controller controlling the controlled mechanism to prevent movement of the rear closure member in the closing direction when more than one object is sensed in the rear protection zone.

According to a third aspect of the invention, there is provided a method of controlling the closing motion of a manually operated top hinged rear closure member of a motor vehicle comprising sensing with rear parking sensors more than one object located within a rear protection zone of the motor vehicle and controlling an electronically controlled mechanism on the motor vehicle to prevent movement of the rear closure member in a closing direction when more than one object is located within the rear protection zone.

The method may further comprise stopping motion of the rear closure member in a closing direction if the number of objects in the protection zone increases to more than one during closing of the rear closure member. The method may further comprise using an electronic controller to operate the electronically controlled mechanism to prevent movement in the closing direction in response to a feedback from the rear parking sensors.

BRIEF DESCRIPTION OF THE DRAWINGS

The invention will now be described by way of example with reference to the accompanying drawing of which.

DETAILED DESCRIPTION OF THE PREFERRED EMBODIMENTS

Figure 1:
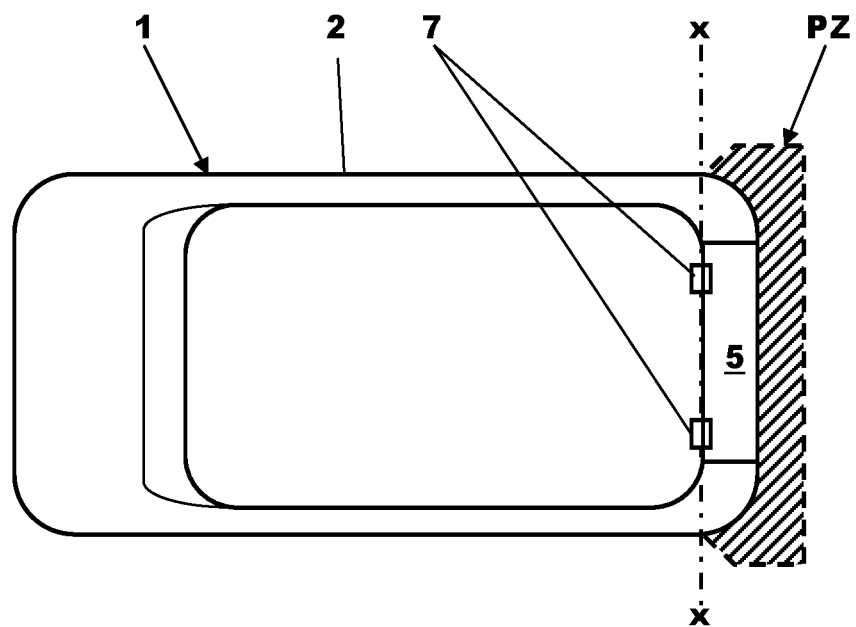
FIG. 1 is a diagrammatic plan view of a motor vehicle having a rear closure member shown in a closed position according to one embodiment.
Figure 2:
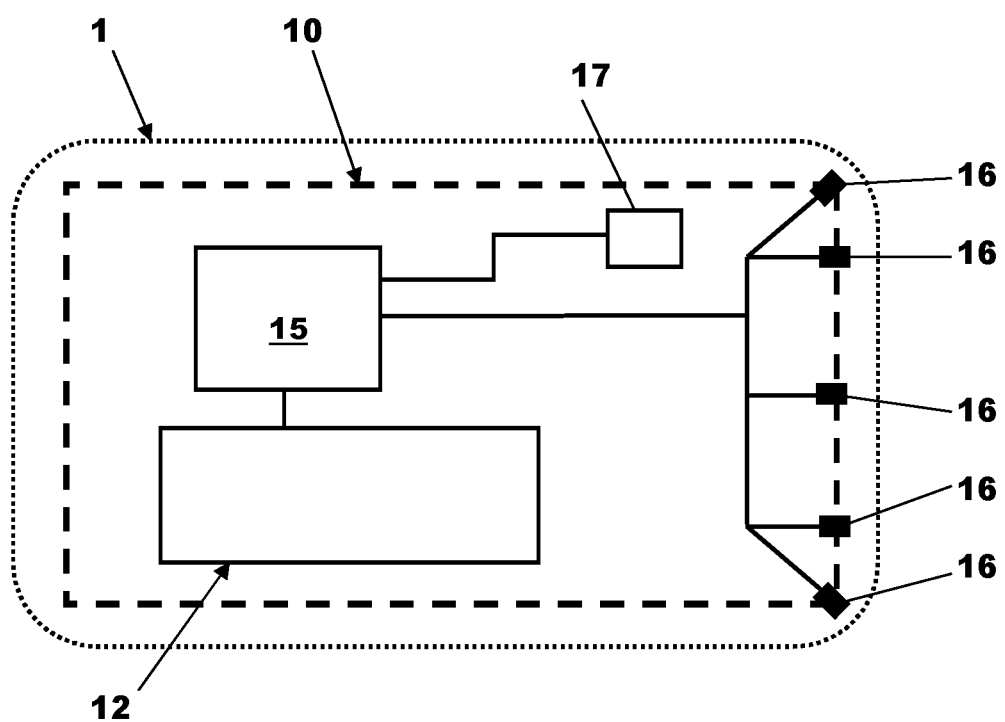
FIG. 2 is a schematic representation of the motor vehicle shown in FIG. 1 showing a safety system forming part of the motor vehicle.
Figure 3:
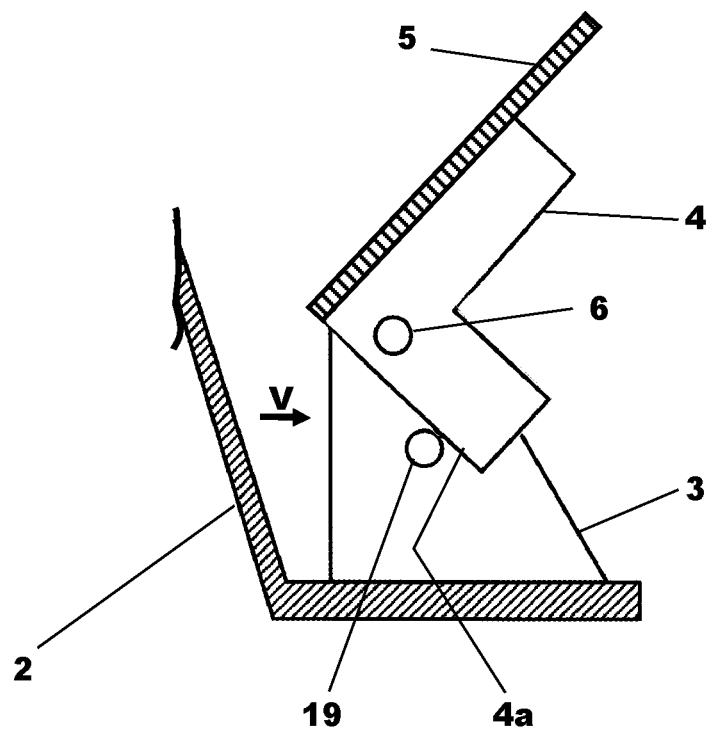
FIG. 3 is a side view of a hinge assembly forming part of a first embodiment of a mechanism forming part of the safety system shown in FIG. 2 showing the rear closure member in a latched open position.
Figure 4:
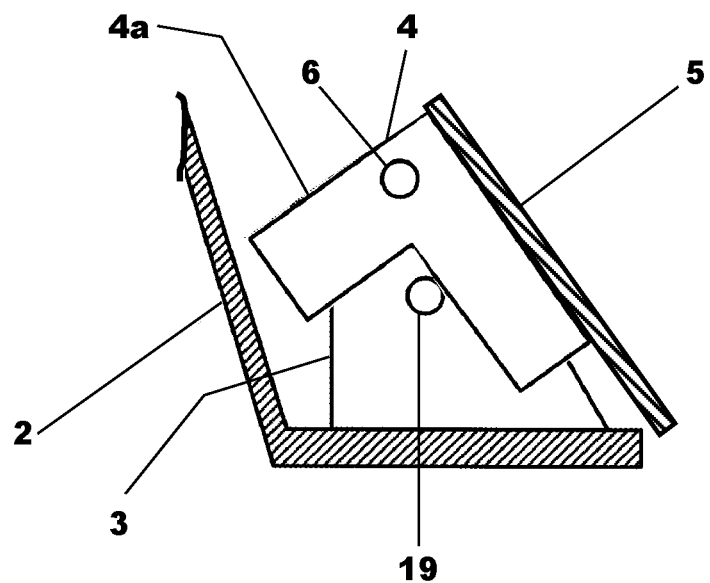
FIG. 4 is a side view similar to FIG. 3 but showing the rear closure member in a closed position.
Figure 5:
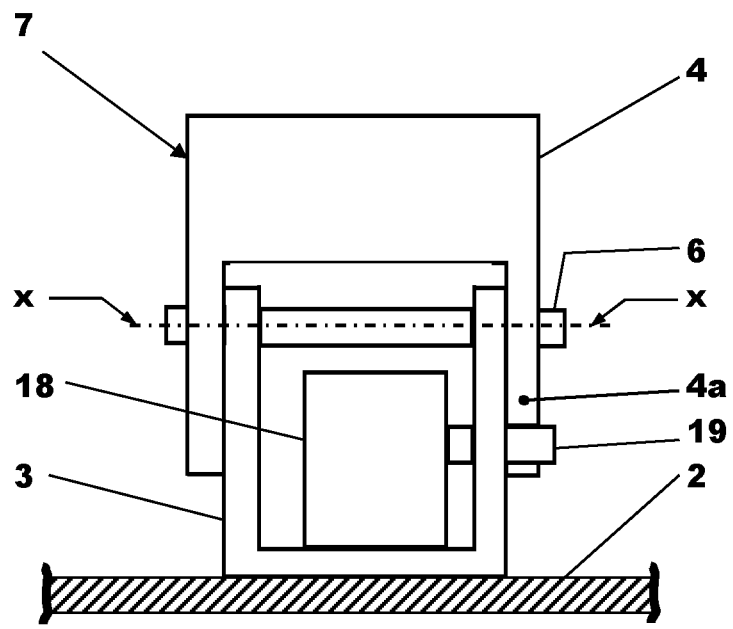
FIG. 5 is a view in the direction of arrow 'V' on FIG. 3 showing a solenoid actuated latch pin engaged with a rear closure member hinge member to hold the rear closure member in the open position.

With particular reference to FIGS. 1 and 2, there is shown a motor vehicle 1 having a body structure 2 to which is hingedly connected at a rear end thereof a rear closure member 5. The rear closure member 5 is a manually moveable closure member which means that opening and closing of the rear closure member 5 is done manually by a person. The rear closure member 5 is hingedly connected to the body structure 2 near a top end by a pair of spaced apart hinge mechanisms 7 which facilitate opening and closing of the rear closure member 5 about a substantially horizontal transverse pivot axis x-x.

The motor vehicle 1 includes a safety system 10. The function of the safety system 10 is to reduce the risk of contact or impact to persons not actively engaged in the closing of the rear closure member 5 when the rear closure member 5 is to be closed or, in some cases, is in the process of being closed. The safety system 10 comprises an electronic controller 15 arranged to receive inputs from a number of rear parking sensors 16 and a rear closure member state input 17 and is arranged to control the operation of an electronically controlled mechanism 12 used to prevent the closing of the rear closure member 5 in certain circumstances.

The rear parking sensors 16 provide an indication to the electronic controller of whether a person is within a predefined area to the rear of the motor vehicle 1 referred to herein as a protection zone PZ. The protection zone PZ is an area in which a person may accidentally be impacted against by the rear closure member 5 during the process of closing of the rear closure member 5 if a person closing the rear closure member 5 is not aware of their presence. This can include a person close enough to the motor vehicle to lean in to a rear luggage compartment during the rear closure closing process to retrieve an item or a person who is so close to the rear of the motor vehicle 1 that closing of the rear closure member will likely produce contact between the rear closure member 5 and that person.

The electronic controller 15 is arranged to operate the electronically controlled mechanism 12 to prevent movement of the rear closure member 5 in the closing direction in response to a feedback from the rear parking sensors 16 when more than one object is sensed within the rear protection zone PZ of the motor vehicle 1 and the rear closure member 5 is in the fully open position. That is to say, the safety system 10 maintains the rear closure member 5 in a fully open position if more than one object is sensed to be in the protection zone PZ. The rear closure member state input 17, in this example, is used to indicate to the electronic controller 15 when the rear closure member 5 is in the fully open and closed states.

In some embodiments, the safety system 10 is arranged to not only maintain the rear closure member 5 in a fully open position if more than one object is sensed to be in the protection zone PZ when the rear closure is fully open, but also to stop motion of the rear closure member 5 in a closing direction if the number of objects in the protection zone increases to more than one during closing of the rear closure member 5.

Referring now to FIGS. 3 to 6, there is shown a first embodiment of an electronically controlled mechanism 12 to prevent movement of the rear closure member 5 in the closing direction. The electronically controlled mechanism 12 is in the form of an electronically controlled latching mechanism comprising a solenoid actuator 18 having a latching pin 19 moveable into engagement with a hinge member 4 forming one half of one of the hinge mechanisms 7 used to hingedly connect the rear closure member 5 to the structural part 2 of the motor vehicle 1. The solenoid actuator 18 is operable in response to a control signal from the electronic controller 15 to move the latching pin 19 into engagement with the hinge member 4 when it is required to prevent movement of the rear closure member 5 in a closing direction and the rear closure member 5 is in a fully open position.

The hinge member is a first hinge member 4 fastened to the rear closure member 5 and the hinge mechanism also includes a second hinge member 3 pivotally connected to the first hinge member 4 by a hinge pin 6. The second hinge member 3 is fastened to part of the body structure 2 of the motor vehicle 1. The hinge pin 6 is coaxially aligned with the pivot axis x-x about which the rear closure member 5 rotates during opening and closing of the rear closure member 5.

Figure 6:
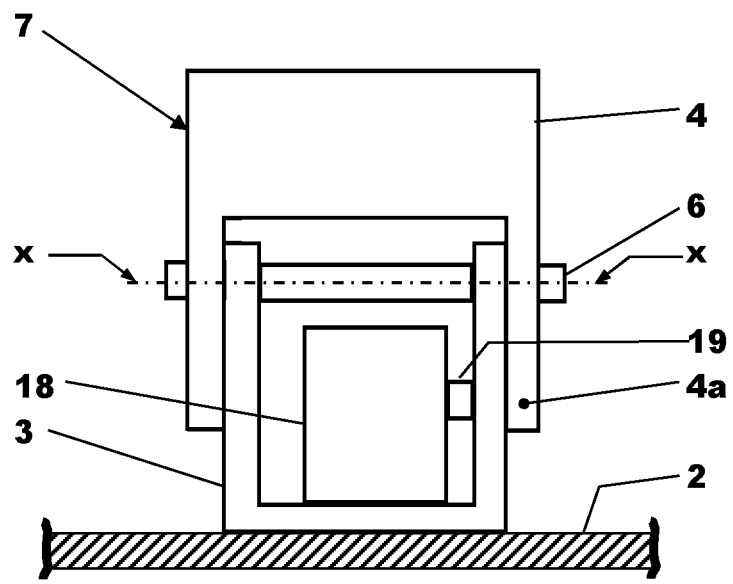
FIG. 6 is a view in the direction of arrow 'V' on FIG. 3 showing the solenoid actuated latch pin disengaged from rear closure member hinge member so as to allow the rear closure member to be moved in a closing direction from the open position.

The solenoid actuator 18 is, in this example, fastened to the second hinge member 3, however, it will be appreciated that the solenoid actuator 18 could alternatively be fastened directly to the body structure 2 of the motor vehicle 1. In this example, the latching pin 19 is biased by a spring (not shown) into an unlatched position as shown in FIG. 6 and moved by the solenoid actuator 18 into engagement with the first hinge member 4 when it is required to prevent movement of the rear closure member 5 in a closing direction which is when more than one object is sensed to be within the protection zone PZ and the rear closure member 5 is in a fully open position as indicated by the rear closure state input 17.

In one embodiment, the latching pin 19 is moved into engagement with an abutment surface 4a on the first hinge member 4 when it is required to prevent movement of the rear closure member 5 in the closing direction. It will be appreciated that the latching pin 19 could alternatively be engageable with an abutment member secured to the first hinge member 4 or be engageable with an aperture formed in the first hinge member 4.

It will also be appreciated that, as an alternative to the foregoing, the solenoid actuator 18 could be mounted on the first hinge member 4 and the latching pin 19 would then engage in some manner with the second hinge member 3 to prevent movement of the rear closure member 5 from the fully open position when required.

It will further be appreciated that both of the hinge mechanisms 7 used to hingedly connect the rear closure member 5 to the body structure 2 could be provided with such electronically controlled latching mechanisms to prevent movement of the rear closure member 5 away from the fully open position when required.

In this embodiment, the solenoid actuator 18 is only switched on to displace the latching pin 19 into a latching position when there is more than one object (e.g., person) in the rear protection zone PZ and the rear closure member 5 is in a fully open position. This is because it is only when the rear closure member 5 is in the fully open position that the latching pin 19 can engage with the abutment surface 4a on the first hinge member 4. That is to say, the arrangement of this example can only hold the rear closure member 5 in the fully open position since it cannot stop closing once it has started.

Figure 7:
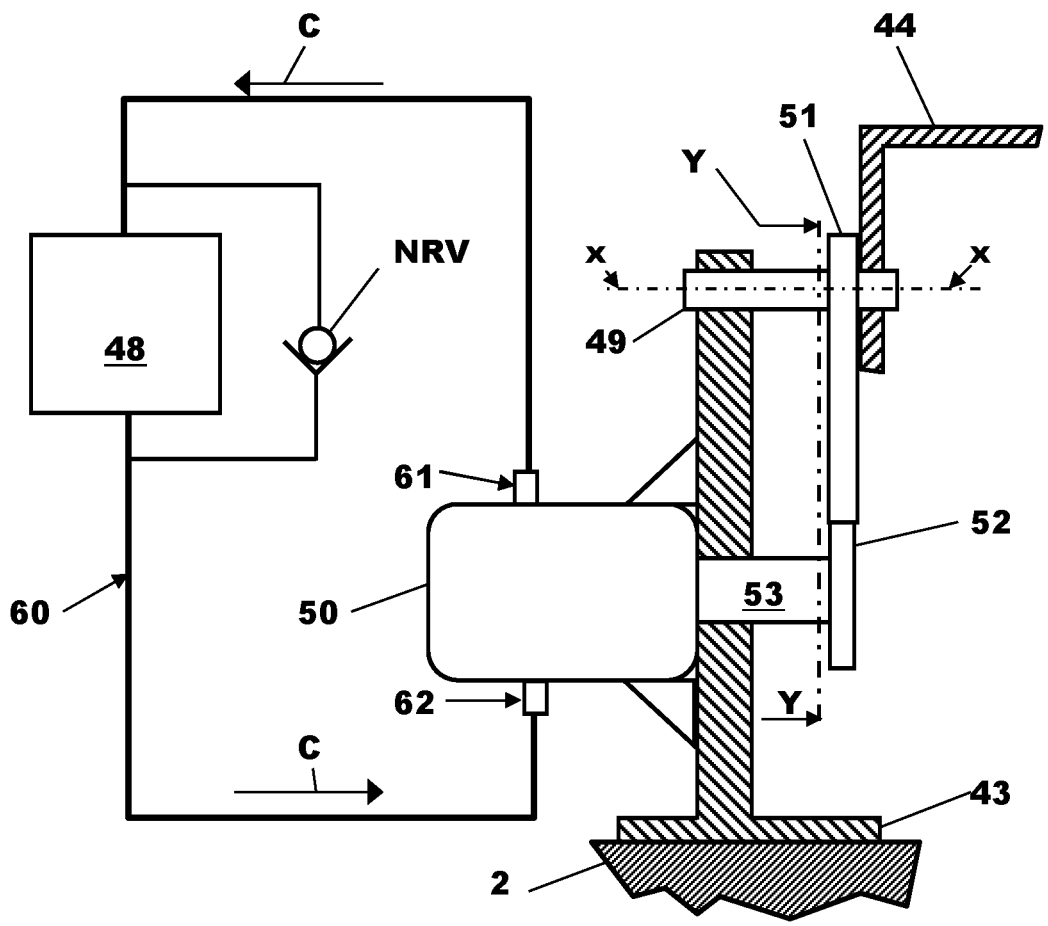
FIG. 7 is a schematic drawing of a second embodiment of a mechanism that is intended to be a direct replacement for the mechanism shown in FIGS. 3 to 6.
Figure 8:
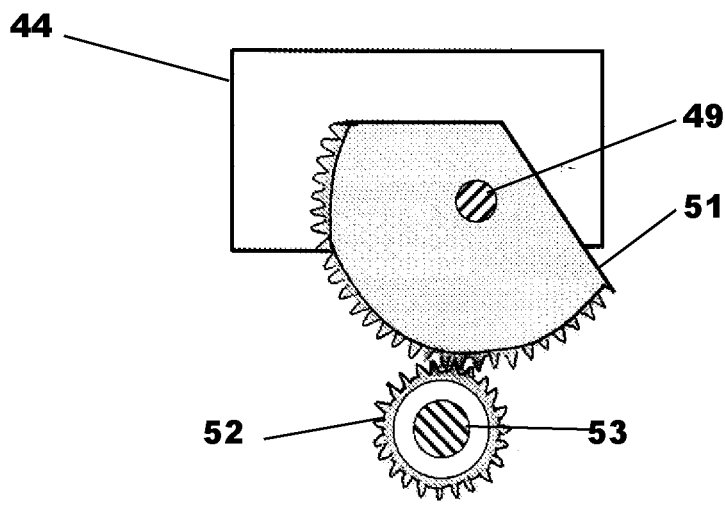
FIG. 8 is a view taken along the line Y-Y in FIG. 7.

Referring now to FIGS. 7 and 8, there is shown a second embodiment of an electronically controlled mechanism 12 to prevent movement of the rear closure member 5 in the closing direction. The electronically controlled mechanism 12 is in this embodiment in the form of an electronically controlled braking mechanism comprising a pump 50 drivingly connected between first and second hinge members 44, 43 forming one of the hinge mechanisms 7 used to hingedly connect the rear closure member 5 to the body structure 2 of the motor vehicle 1 and an electronically controlled valve 48 to selectively prevent the flow of fluid such as oil from an outlet 61 of the pump 60 to an inlet 62 of the pump 50 through a recirculation circuit 60 when it is required to prevent movement of the rear closure member 5 in a closing direction which is when more than one object is sensed to be within the protection zone PZ.

The first hinge member 44 is pivotally connected to the second hinge member 43 by a pivot pin 49 arranged coaxially with respect to the transverse pivot axis x-x about which the rear closure member 5 rotates between open and closed positions. The second hinge member 3 is fastened to the body structure 2 of the motor vehicle 1.

The pump 50 has a rotor (not shown) connected to an input shaft 53 that has a gear wheel 52 fastened thereto that is drivingly connected to quadrant gear 51 fastened to the first hinge member 44. The pump 50 is therefore connected to the first hinge member 44 by the input shaft 53 and so, if the input shaft 53 is prevented from rotation, the rear closure member 5 that is fastened to the first hinge member 44 is also prevented from rotation, thereby preventing movement of the rear closure member 5.

The electronically controlled valve is in the form of a solenoid valve 48 operatively controlled by the electronic controller 15 that, when closed, prevents the flow of oil through the recirculation circuit 60 in the direction of the arrows "C" from the outlet 61 to the inlet 62 when it is required to prevent movement of the rear closure member 5 in the closing direction. A non-return valve "NRV" is arranged to bypass the solenoid valve 48 to permit flow in a direction opposite to that shown by the arrows "C" through the recirculation circuit 60 even if the solenoid valve 48 is closed. This allows the rear closure member 5 to be moved from the closed position to the open position even if there is more than one object in the rear protection zone PZ.

Therefore, when the solenoid valve 48 is closed, no oil can flow through the recirculation circuit 60 in the direction of the arrows "C," but flow in the opposite direction is possible through the non-return valve "NRV." Therefore, rotation of an input shaft 53 of the pump 50 is prevented when the solenoid valve 48 is closed, thereby preventing movement of the rear closure member 5 in a rear closure closing direction but not movement in a rear closure opening direction.

It will be appreciated that instead of providing a non-return valve bypassing the solenoid valve 48, the electronic controller 15 could be arranged to only close the solenoid valve 48 when there is more than one object in the rear protection zone PZ and the rear closure member 5 is sensed to be moving in a closing direction.

One significant difference between this second embodiment and the first embodiment is that the electronically controlled braking mechanism of this second embodiment can be used to prevent movement in the closing direction not only when the rear closure member 5 is in the fully open position but also during closing of the rear closure member 5. That is to say, if during the process of closing of the rear closure member 5, more than one object is sensed to be within the protection zone PZ because, for example, a person has entered the protection zone PZ during the closing process, then the electronic controller 15 can immediately close the solenoid valve 48, thereby preventing further motion of the rear closure member 5 in the closing direction.

It will be appreciated that it would be possible by sensing the movement of the rear closure member at all times to switch-off the solenoid valve 48 once the rear closure member 5 has been closed more than a predefined amount. The predefined amount may correspond to a rear closure position where the risk of accidental collision and potential to a third party is considered to be minimal.

It will be appreciated that both of the hinge mechanisms 7 used to hingedly connect the rear closure member 5 to the body structure 2 could be provided with such electronically controlled braking mechanisms to prevent movement of the rear closure member 5 in the closing direction when required.

It will also be appreciated that other braking mechanisms could be used in a similar manner to the braking mechanism shown in FIGS. 7 and 8. For example and without limitation, an electronically engageable clutch could be drivingly connected between the first and second hinge members and the electronic controller could be arranged to engage the clutch when it is required to prevent closing movement of the rear closure member.

As yet another example, a double acting ram could be interposed between the body structure and the rear closure member and the flow of liquid from one end of the ram to an opposite end of the ram can be controlled by a solenoid valve that can be closed by an electronic controller when it is required to prevent closing movement of the rear closure member.

Figure 9:
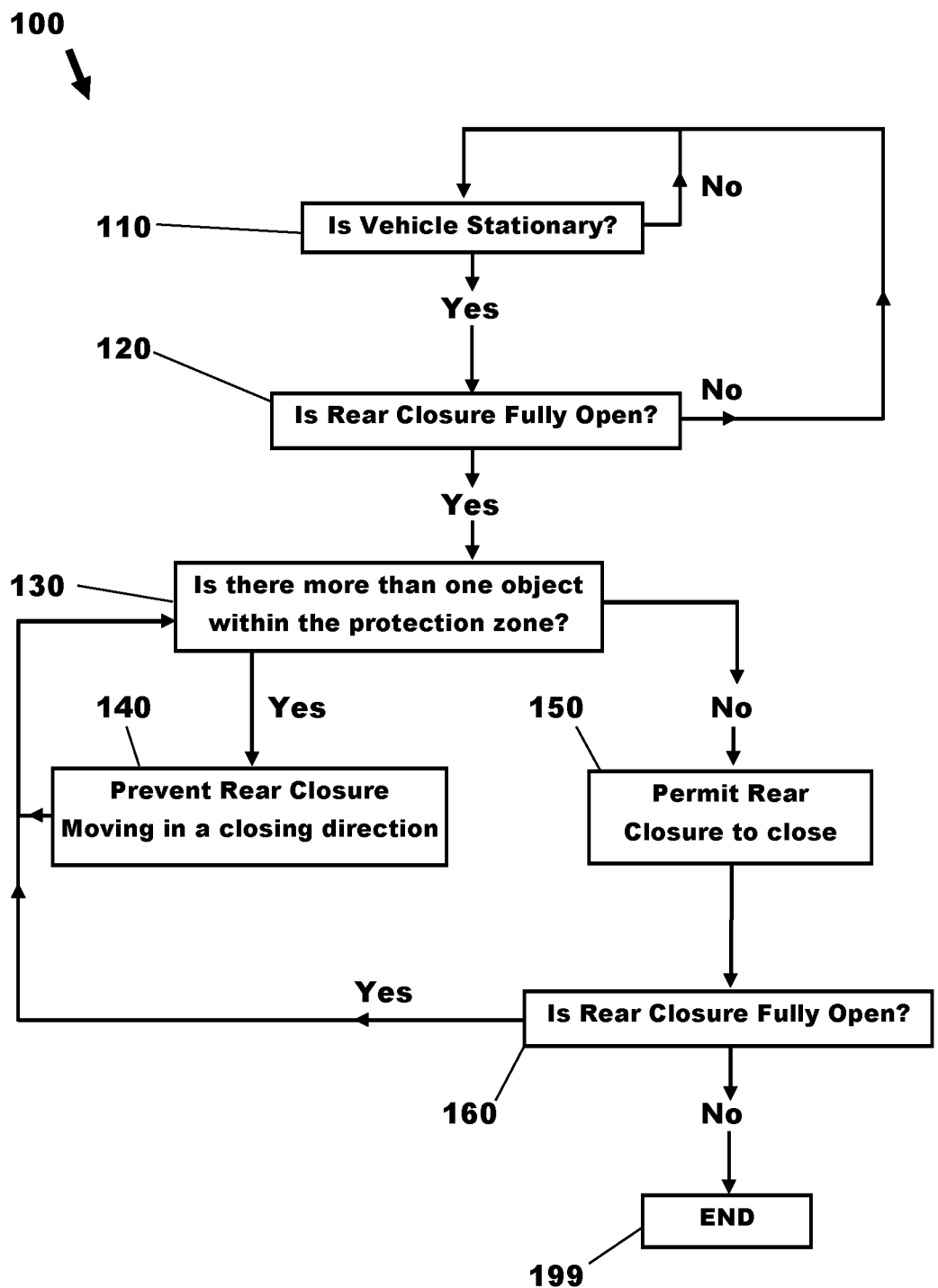
FIG. 9 is a high level flow chart of a first embodiment of a method of controlling closing of a rear closure member.

With particular reference to FIG. 9 there is shown a first embodiment of a method of controlling closing of a rear closure member of a motor vehicle such as the rear closure member 5 of the motor vehicle 1. The method 100 starts in box 110 by checking whether the motor vehicle is stationary and, if it is not, no action is taken. That is to say, the method 100 is only used when the motor vehicle is not moving.

If when checked in box 110 the motor vehicle is determined to be stationary, the method advances to box 120 to check whether the rear closure member is fully open. If the rear closure member is not fully open, then the method returns to box 110 and will cycle around boxes 110 and 120 until the rear closure is determined to be fully open. That is to say, the method 100 only applies to a situation where the rear closure member is fully open and so is applicable to a safety system having a latching mechanism such as that shown in FIGS. 3 to 6 where the rear closure member can only be prevented from closing from a fully open position.

When the rear closure member is opened, a rear protection zone is enabled by switching on rear parking sensors. If it is determined in box 120 that the rear closure member is fully open the method advances to box 130. In box 130 the method checks whether there is more than one object in the protection zone. That is to say, it is checked whether there is more than one person located in a position where they could be impacted against by the rear closure member if the rear closure member is moved in a closing direction.

If it is determined in box 130 that there is more than one object in the protection zone, then the method advances to box 140 where movement of the rear closure member away from the fully closed position is prevented. That is to say a latching mechanism such as that shown in FIGS. 3 to 6 is engaged to prevent movement of the rear closure member.

The method then returns from box 140 to box 130 to re-check whether there is still more than one object in the protection zone and, if there is, the method returns to box 140 and will continue to cycle around boxes 130 and 140 with the rear closure held open until in box 130 there is a finally a determination that there is no longer more than one object in the protection zone at which time the method advances to box 150 where closing of the rear closure is permitted. From box 150 the method advances to box 160 to check whether the rear closure member is still fully open and, if it is, will return to box 130. If the rear closure member is not fully open, the method will advance to box 199 where it ends.

It will be appreciated that although in box 150 the method is permitted to close the rear closure member, a user may not have actually started the closing process and so the rear closure member will remain fully open and hence the return from box 160 to box 130.

Returning to box 130, if the answer to the test in box 130 is "No," then the method advances to box 150 where closing of the rear closure member is permitted because only one person is present and so there is no risk of impacting another party. It will be appreciated if there are zero objects in the protection zone there is always no risk of impact because the rear closure member is manually operated and so cannot close without a person to close it. From box 150 the method advances to box 160 to check whether the rear closure member is still fully open. If the rear closure member is still fully open, then the method returns to box 130 and if the rear closure member is not still fully open it will advance to box 199 where it ends.

Although not shown in FIG. 9, it will be appreciated that if closing of the rear closure member is being prevented then a user of the motor vehicle may be provided with a warning of that fact. That is to say box 140 may include not only a rear closure prevention action but also a user warning action.

Figure 10:
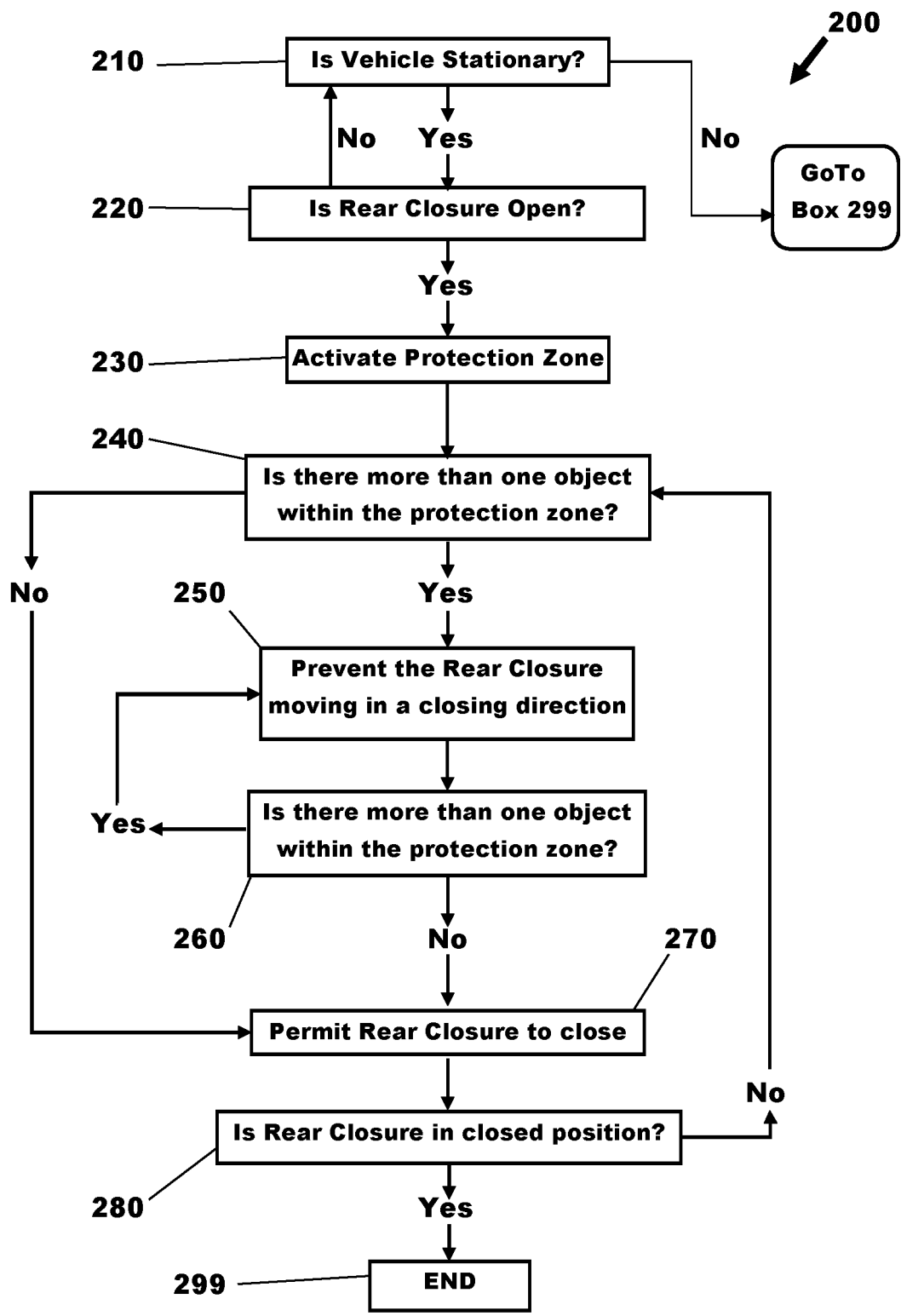
FIG. 10 is a high level flow chart of a second embodiment of a method of controlling closing of a rear closure member.

With particular reference to FIG. 10 there is shown a second embodiment of a method of controlling closing of a rear closure member of a motor vehicle such as the rear closure member 5 of the motor vehicle 1. The method 200 starts in box 210 by checking whether the motor vehicle is stationary and, if it is not, advances to box 199 where it ends. That is to say, the method 200 is only used when the motor vehicle is not moving. If when checked in box 210 the motor vehicle is determined to be stationary, then the method advances to box 220 to check whether the rear closure member is fully open. If the rear closure member is not fully open, then the method returns to box 210 and will cycle around boxes 210 and 220 until the rear closure is determined to be fully open. When it is determined in box 220 that the rear closure member is fully open, the method will advance from box 220 to box 230. In box 230 a rear protection zone is activated by, for example, switching on rear parking sensors.

The method then advances from box 230 to box 240 where it is checked whether there is more than one object in the protection zone. That is to say, it is checked whether there is more than one person located in a position where they could be impacted against by the rear closure member if the rear closure member is moved in a closing direction. If the answer to the test in box 240 is "No," then the method advances to box 270 where closing of the rear closure member is permitted because only one person is present and so there is no risk of impact with another party. It will be appreciated if there are zero objects in the protection zone there is no risk of impact with a person because the rear closure member is manually operated and so closing of the rear closure member requires manual input from a person.

From box 270 the method advances to box 280 to check whether the rear closure member is closed and, if it is not, returns back to box 240 and will continue to cycle through the boxes 240, 270 and 280, provided the test in box 240 indicates that there is not more than one object in the protection zone until such time as it is determined in box 280 that the rear closure member is in a closed position at which time the method advances to box 299 where it ends.

Returning to box 240 if it is determined that there is more than one object in the protection zone then the method advances to box 250. In box 250 movement of the rear closure member in a closing direction is prevented. From box 250 the method then advances to check in box 260 whether there is still more than one object in the protection zone and, if there is more than one object, the method returns to box 250 and will continue to cycle around boxes 250 and 260 until there is a determination in box 260 that there is no longer more than one object in the protection zone at which time the method advances to box 270 where closing of the rear closure member is permitted.

From box 270 the method advances to box 280 to check whether the rear closure member is closed and, if it is not, returns back to box 240. If when checking box 240 there is not more than one object in the protection zone the method will proceed as before to box 270 and, if when checked in box 240, there is more than one object in the protection zone the will proceed as before to box 250. Finally when it is determined in box 280 that the rear closure member is in a closed position the method 200 advances to box 299 where it ends.

Therefore in this case it is continuously checked whether there is more than one object in the protection zone during closing of the rear closure member and if the number of objects in the protection zone increases above one the method takes account of this and then prevents further closing movement of the rear closure member even after closing has started until the number of objects is no longer more than one.

It will be appreciated that if at any time closing of the rear closure member is being prevented, then a user of the motor vehicle may be provided with a warning of that fact. That is to say box 250 may include both a movement preventing action and a user alerting action.

Therefore, whenever a rear closure member is in a fully open position the closing of the rear closure member is prevented if more than one object is sensed to be in a rear protection zone thereby reducing the risk of injury from occurring to another person not actually closing the rear closure member. In some cases the electronically controlled mechanism used to prevent closing of the rear closure may be constructed such that it is able to stop closing after it has started as well as prevent movement from the fully open position.

It will be appreciated that the electronically controlled mechanisms are exemplary in nature and not intended to represent production ready embodiments. Furthermore, the methods indicated in the two flow charts are only intended to represent two examples of how the invention can be put into effect.

It will be appreciated by those skilled in the art that although the invention has been described by way of example with reference to one or more embodiments it is not limited to the disclosed embodiments and that alternative embodiments could be constructed without departing from the scope of the invention as defined by the appended claims.

The invention claimed is:

1. A motor vehicle comprising:
a top hinged rear closure member manually moveable between open and closed positions;
an electronically controlled mechanism to prevent, at least when the rear closure member is in a fully open position, movement of the rear closure member in a closing direction;
a number of rear parking sensors to provide an indication of whether one or more objects lies within a rear protection zone in which a person may accidentally be impacted by the rear closure member during closing of the rear closure member; and
an electronic controller arranged to operate the electronically controlled mechanism to prevent movement of the rear closure member in the closing direction when the parking sensors indicate that more than one object is located within the rear protection zone and to permit closing of the rear closure when the rear parking sensors indicate only one object lies within the rear protection zone.

2. The motor vehicle as claimed in claim 1, wherein the electronic controller is arranged to operate the electronically controlled mechanism to prevent movement of the rear closure member in a closing direction only if the rear closure member is in a fully open position.

3. The motor vehicle as claimed in claim 1, wherein the electronic controller is arranged to operate the electronically controlled mechanism to prevent movement of the rear closure member in a closing direction when the rear closure member is in a partially closed position.

4. The motor vehicle as claimed in claim 1, wherein the electronically controlled mechanism is an electronically controlled latching mechanism comprising a solenoid actuator having a latching pin moveable into engagement with a hinge member forming one half of a hinge mechanism used to hingedly connect the rear closure member to a structural part of the motor vehicle to prevent movement of the hinge member and the solenoid actuator is operable to move the latching pin into engagement with the hinge member when it is required to prevent movement of the rear closure member in a closing direction.

5. The motor vehicle as claimed in claim 4, wherein the latching pin is moved into engagement with an abutment surface on the hinge member when it is required to prevent movement of the rear closure member in a closing direction.

6. The motor vehicle as claimed in claim 4, wherein the hinge member is a first hinge member fastened to the rear closure member and the hinge mechanism includes a second hinge member pivotally connected to the first hinge member and fastened to part of a body structure of the motor vehicle and the solenoid actuator is fastened to the second hinge member.

7. The motor vehicle as claimed in claim 1, wherein the electronically controlled mechanism comprises a pump drivingly connected between first and second hinge members forming a hinge mechanism used to hingedly connect the rear closure member to a body structure of the motor vehicle and an electronically controlled valve to prevent flow of liquid from an outlet of the pump to an inlet of the pump through a recirculation circuit when it is required to prevent movement of the rear closure member in a closing direction.

8. The motor vehicle as claimed in claim 7, wherein the first hinge member is a hinge member fastened to the rear closure member and the second hinge member is a hinge member pivotally connected to the first hinge member and fastened to the body structure of the motor vehicle.

9. The motor vehicle as claimed in claim 8, wherein the pump is fastened to the second hinge member and has a drive shaft drivingly connected by a gear wheel to a quadrant gear fastened to the first hinge member.

10. A vehicle comprising:
a rear closure member manually moveable between open and closed positions;
a controlled mechanism to prevent movement of the rear closure member in a closing direction at least when the rear closure member is in a fully open position;
sensors sensing objects located within a rear protection zone in which a person may accidentally be impacted by the rear closure member during closing of the rear closure member; and
a controller controlling the controlled mechanism to prevent movement of the rear closure member in the closing direction when more than one object is sensed in the rear protection zone and to permit closing of the rear closure when only one object is sensed within the rear protection zone.

11. The vehicle as claimed in claim 10, wherein the sensors comprise a plurality of rear parking sensors.

12. The vehicle as claimed in claim 10, wherein the rear closure member comprises a top hinge.

13. The vehicle as claimed in claim 10, wherein the controller is arranged to operate the controlled mechanism to prevent movement of the rear closure member in a closing direction only if the rear closure member is in a fully open position.

14. The vehicle as claimed in claim 10, wherein the controller is arranged to operate the controlled mechanism to prevent movement of the rear closure member in a closing direction when the rear closure member is in a partially closed position.

15. The vehicle as claimed in claim 10, wherein the controlled mechanism is an electronically controlled latching mechanism comprising a solenoid actuator having a latching pin moveable into engagement with a hinge member forming one half of a hinge mechanism used to hingedly connect the rear closure member to a structural part of the motor vehicle to prevent movement of the hinge member and the solenoid actuator is operable to move the latching pin into engagement with the hinge member when it is required to prevent movement of the rear closure member in a closing direction.

16. The vehicle as claimed in claim 15, wherein the latching pin is moved into engagement with an abutment surface on the hinge member when it is required to prevent movement of the rear closure member in a closing direction.

17. The vehicle as claimed in claim 15, wherein the hinge member is a first hinge member fastened to the rear closure member and the hinge mechanism includes a second hinge member pivotally connected to the first hinge member and fastened to part of a body structure of the motor vehicle and the solenoid actuator is fastened to the second hinge member.

18. A method of controlling closing motion of a manually operated top hinged rear closure member of a motor vehicle, comprising:

sensing with rear parking sensors more than one object located within a rear protection zone of the motor vehicle in which a person may accidentally be impacted by the rear closure member during closing of the rear closure member; and controlling an electronically controlled mechanism on the motor vehicle to prevent movement of the rear closure member in a closing direction when more than one object is located within the rear protection zone and to permit closing of the rear closure when the rear parking sensors indicate only one object lies within the rear protection zone.

19. The method as claimed in claim 18 further comprising: the step of stopping motion of the rear closure member in a closing direction if the number of objects in the protection zone increases to more than one during closing of the rear closure member.

20. The method as claimed in claim 18 further comprising using an electronic controller to operate the electronically controlled mechanism to prevent movement in the closing direction at least when the rear closure member is in a fully open position in response to a feedback from the rear parking sensors.

* * * * *